(12) United States Patent
Yamada et al.

(10) Patent No.: US 7,716,405 B2
(45) Date of Patent: May 11, 2010

(54) COMPUTER SYSTEM

(75) Inventors: Tsutomu Yamada, Hitachinaka (JP); Hiromichi Endoh, Hitachi (JP); Noritaka Matsumoto, Hitachi (JP); Satoru Funaki, Hitachi (JP); Tatsuya Maruyama, Hitachi (JP); Atsushi Ito, Shiroi (JP); Fumiyuki Tamura, Sakura (JP); Norihisa Yanagihara, Tokyo (JP); Makiko Naemura, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 49 days.

(21) Appl. No.: 11/599,383

(22) Filed: Nov. 15, 2006

(65) Prior Publication Data

US 2007/0112983 A1    May 17, 2007

(30) Foreign Application Priority Data

Nov. 15, 2005    (JP)    ............................. 2005-329703

(51) Int. Cl.
  *G06F 13/36* (2006.01)
(52) U.S. Cl. .................................. 710/115; 710/104
(58) Field of Classification Search .................. 710/110, 710/301, 104, 105, 115, 117, 313, 240
  See application file for complete search history.

(56) References Cited

U.S. PATENT DOCUMENTS

| | | | |
|---|---|---|---|
| 4,926,419 A | | 5/1990 | Whipple |
| 5,668,949 A * | | 9/1997 | Nardone et al. ............. 709/201 |
| 6,636,901 B2 * | | 10/2003 | Sudhakaran et al. ........ 719/327 |
| 6,678,747 B2 * | | 1/2004 | Goossen et al. ................ 710/2 |
| 6,799,234 B1 * | | 9/2004 | Moon et al. .................. 710/110 |
| 7,024,494 B1 * | | 4/2006 | Pathan et al. .................. 710/10 |
| 2004/0215841 A1 | | 10/2004 | Yamada et al. |
| 2008/0077718 A1 * | | 3/2008 | Kn et al. ..................... 710/104 |

FOREIGN PATENT DOCUMENTS

| JP | 2000-347991 | 12/2000 |
|---|---|---|
| JP | 2004-326342 | 11/2004 |

OTHER PUBLICATIONS

PC/104-Plus Specification Version 2.0, PC/104 Embedded Consortium, Nov. 2003.
PCI Local Bus Specification Revision 2.3, PCI Special Interest Group, Mar. 29, 2002, p. 1-314.

* cited by examiner

*Primary Examiner*—Khanh Dang
(74) *Attorney, Agent, or Firm*—Antonelli, Terry, Stout & Kraus, LLP.

(57) ABSTRACT

A computer system, being a stack bus system in which a plurality of computer modules are stacked and connected to one another and being capable of automatically matching and allocating bus resources such as clocks and interrupts, is provided. In the computer system including one system module and n peripheral modules, each peripheral module includes an interrupt selector, a clock selector, an arbitration signal selector, a resource decision unit, and a position identification unit. The position identification unit cooperates with a position configuration unit present in the system module to identify a position of the module, which includes the position identification unit, in the computer system, and autonomously decides bus resources used by the module. By allowing the interrupt selector, the clock selector, and the arbitration signal selector to select and use the decided bus resources, each peripheral module can match and configure the bus resources in the computer system.

19 Claims, 12 Drawing Sheets

| VALUE OF SELECTION SIGNAL ||  FUNCTION |
|---|---|---|
| sel[1] | sel[0] | |
| 0 | 0 | y is connected to x[1]. |
| 0 | 1 | y is connected to x[2]. |
| 1 | 0 | y is connected to x[3]. |
| 1 | 1 | y is connected to x[4]. |

| INPUT | | OUTPUT | |
|---|---|---|---|
| SWITCH DISABLE SIGNAL 65 | POSITION INFORMATION 27 | 63-1 | 63-2 |
| 1 | 0001 | 0 | 0 |
| 1 | 0010 | 0 | 1 (Hi-Z) |
| 1 | 0100 | 1 (Hi-Z) | 0 |
| 1 | 1000 | 1 (Hi-Z) | 1 (Hi-Z) |
| 0 | Don't Care | Hi-Z | Hi-Z |

| INPUT posY[4:1] | OUTPUT posX[4:1] |
|---|---|
| 0000 | 0001 |
| 0001 | 0010 |
| 0010 | 0100 |
| 0100 | 1000 |
| 1000 | 1111 |

| INPUT posY[4:1] | OUTPUT posX[4:1] |
|---|---|
| 0000 | 0001 |
| 0001 | 0010 |
| 0010 | 0011 |
| 0011 | 0100 |
| 0100 | 0101 |
| : | : |
| 1111 | 0000 |

COMPUTER SYSTEM

CROSS-REFERENCE TO RELATED APPLICATION

The present application claims priority from Japanese patent application No. JP 2005-329703 filed on Nov. 15, 2005, the content of which is hereby incorporated by reference into this application.

BACKGROUND OF THE INVENTION

The present invention relates to a computer system configured by a plurality of computer modules connected to one another through a bus and, more specifically, to a technique effectively applicable to a method and an apparatus configuration of adjusting a bus resource such as a bus clock and an interrupt.

In relation to a method of connecting the computer modules through a bus, a bus technique disclosed in, for example, PC/104 Embedded Consortium "PC/104-Plus Specification Version 2.0" (Non-patent Document 1) is known. Namely, the bus technique is PC/104-Plus in which a plurality of computer modules or input/output modules (hereinafter, "computer modules") are connected to one another through stacking connectors (hereinafter, "conventional example 1").

In this conventional example 1, a Peripheral Component Interconnect (PCI) bus disclosed in PCI SIG "PCI Local Bus Specification Rev 2.3" (Non-patent Document 2) is used as a bus protocol, and an electric signal line is compliant with PCI bus specification.

Signals necessary for management and operation of a bus are referred to as "bus resources" in the present specification. Examples of the bus resources include a clock signal for allowing devices connected to the bus to operate synchronously with one another, a bus arbitration (bus request/bus grant) signal for arbitrating an ownership of the bus, a bus interrupt signal for causing one of the devices to notify the other devices of an event, and an IDSEL signal for designating one device during a device configuration.

In the conventional example 1, it is required for one module to manage the bus resources and for the other modules to exclusively connect the bus resources. As such a method, an example of configuring the modules according to physical positions of the modules using switches and jumper wires, etc. is disclosed in the conventional example 1.

Meanwhile, a technique for preparing a plurality of bus arbitration apparatuses for managing bus arbitration signals to enable one of the bus arbitration apparatuses is disclosed in Japanese Patent Laid-Open Publication No. 2000-347991 (Patent Document 1) (hereinafter, "conventional example 2").

According to the conventional example 2, in data processing apparatuses equal in configuration and each including the bus arbitration apparatus are connected to a backplane on which the bus signals are supplied in advance. Only one of the bus arbitration apparatuses receiving and handling the bus arbitration signal must be activated on a bus system. To attain such a purpose, the conventional example 2 discloses a technique for activating only one among the plurality of bus arbitration apparatuses.

SUMMARY OF THE INVENTION

However, the conventional examples have the following disadvantages.

That is, in the method disclosed in the conventional example 1, it is necessary to manually configure the bus resources required to be exclusively allocated at a time of assembling the computer modules. Since the conventional example 1 employs a stack bus connector, the same signal set is supplied to all the computer modules. The computer modules themselves include no means for dynamically learning the bus resources to be acquired. Due to this, each computer module is incapable of autonomously selecting the bus resources that the computer module itself requires from the signal set. Therefore, it becomes necessary to manually configure the bus resources.

If the bus resources are not appropriately configured manually, outputs of devices collide against one another on the bus during a bus operation. This sometimes causes destruction of the devices.

In the method disclosed in the conventional example 2, the backplane for connecting a plurality of data processing apparatuses becomes necessary. In the conventional example 2, bus arbitration signals inputted/outputted to/from the respective data processing apparatuses are supplied to appropriate destinations by using the backplane. On the other hand, as described above, for the stack bus such as PC/104-Plus, the same signal set is supplied to all the computer modules. Due to this, for example, if the data processing apparatuses have the same circuit configuration, they input/output the same bus arbitration signal. As a result, signal collision occurs. The same problem occurs also to the clock signal and the other bus resources.

Therefore, in view of the above problems, an object of the present invention is to provide a computer system, wherein bus resources such as a clock and an interrupt can be automatically conformed with and allocated in a stack bus system in which a plurality of computer modules are stacked and connected to one another.

The above and other objects and novel features of the present invention will be apparent from the description of the specification and the accompanying drawings.

Outline of typical ones of the inventions disclosed in the present application will be described briefly as follows.

The present invention is applied to a computer system comprising a plurality of computer modules connected to one another through a system bus having bus resources such as interrupts and clocks, and has the following features:

(1) A first computer module among the plurality of computer modules includes position configuration means for outputting position configuration information, and bus resource managing means. A second computer module among the plurality of computer modules includes position identifying means for identifying a position of the second computer module to output position information on the second computer module, resource deciding means for deciding the bus resources used by the second computer module based on the position information to output resource selection information, and resource selecting means for selecting the bus resources based on the resource selection information. Further, for the bus resources managed by the bus resource managing means, the second computer module receives the position configuration information configured by the first computer module, selects the bus resources according to the position of the second computer module itself, and uses the selected bus resources.

(2) A first computer module among the plurality of computer modules includes bus resource managing means. A second computer module among the plurality of computer modules includes position identifying means for identifying a position of the second computer module to output position information on the second computer module, and resource deciding means for deciding the bus resources used by the second computer module based on the position information to output resource selection information, and resource selecting means for selecting the bus resources based on the resource selection information. Further, for the bus resources managed by the bus resource managing means, the second computer module selects the bus resources according to the position of the second computer module itself, and uses the selected bus resources.

(3) A first computer module among the plurality of computer modules includes position configuration means for outputting position configuration information, and clock managing means. A second computer module among the plurality of computer modules includes position identifying means for identifying a position of the second computer module to output position information on the second computer module, resource deciding means for deciding the bus resources used by the second computer module based on the position information to output resource selection information, and resource selecting/managing means for selecting or managing the bus resources based on the resource selection information. Further, for the bus resources managed by the clock managing means or resource selecting/managing means, the second computer module receives the position configuration information configured by the first computer module, selects the bus resources according to the position of the second computer module itself, and uses the selected bus resources.

(4) A first computer module among the plurality of computer modules includes clock managing means. A second computer module among the plurality of computer modules includes position identifying means for identifying a position of the second computer module to output position information on the second computer module, resource deciding means for deciding the bus resources used by the second computer module based on the position information to output resource selection information, and resource selecting/managing means for selecting or managing the bus resources based on the resource selection information. Further, for the bus resources managed by the clock managing means or resource selecting/managing means, the second computer module selects the bus resources according to the position of the second computer module itself and uses the selected bus resources.

(5) A second computer module among the plurality of computer modules includes position identifying means for identifying a position of the second computer module to output position information on the second computer module, resource deciding means for deciding the bus resources used by the module based on the position information to output resource selection information, and resource selecting/managing means for selecting or managing the bus resources based on the resource selection information. Further, for the bus resources managed by the resource selecting/managing means, the second computer module selects the bus resources according to the position of the second computer module itself and uses the selected bus resources.

(6) In above items (1) to (5), the resource deciding means includes a resource configuration switch and a manual configuration enable switch. Further, if manual configuration is enabled by the manual configuration enable switch, the resource selection information is outputted using the resource configuration switch.

(7) In above items (1) to (6), the second computer module includes a plurality of second sub computer modules each including a pair of position information connectors connected to the position identification means. Further, the plurality of second sub computer modules are connected to one another through the pair of position information connectors in a stack manner without depending on physical positions of the plurality of second sub computer modules stacked.

Effects obtained from representative ones of the inventions disclosed in the present application will be briefly described as follows.

According to the present invention, in the computer system constituted by the plurality of computer modules, each computer module can autonomously select the bus resources such as the clock and interrupt signals used by the computer module itself. Therefore, it is possible to eliminate miss configurations due to the conventional manual operations and prevent failure of devices. Moreover, since there does not depend on physical positions of the computer modules stacked, a degree of freedom for assembling the computer modules can be improved. For this reason, the present invention can obtain effects of reducing the time and costs required for configuring the computer system.

DESCRIPTION OF THE PREFERRED EMBODIMENTS

Figure 1:
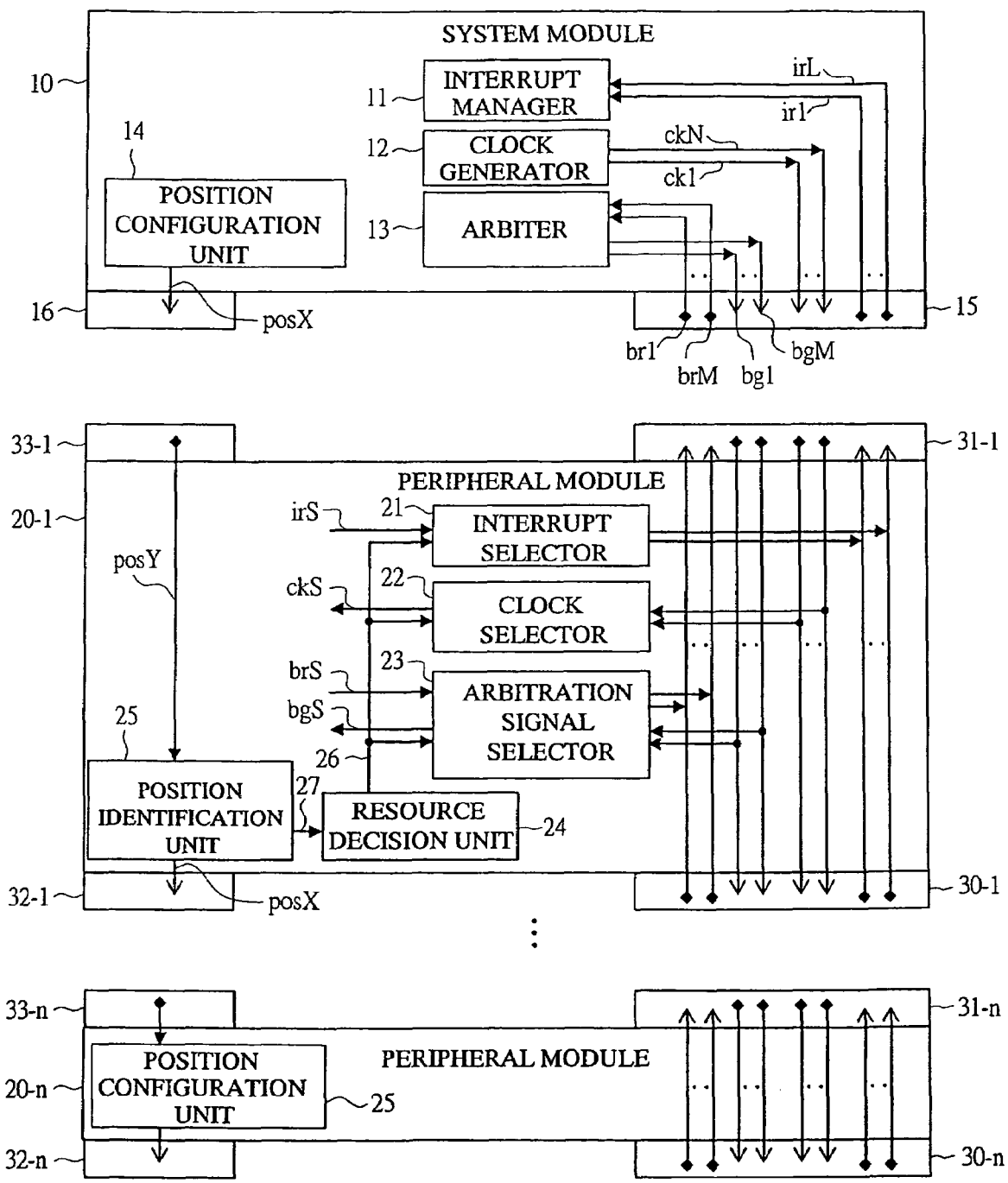
FIG. 1 is a view showing one example of a configuration of a computer system according to a first embodiment of the present invention.

Embodiments of the present invention will be described hereinafter in detail with reference to the drawings. Note that in the drawings for describing the embodiments, the same members are denoted by the same reference symbols and the repetitive explanation thereof will be omitted.

Concept of Embodiments of the Invention

The present invention relates to a stack bus system in which a plurality of computer modules are stacked and connected to one another, wherein bus resources are automatically conformed with and acquired in each computer module.

First Embodiment

FIG. 1 is a view showing one example of a configuration of a computer system according to a first embodiment of the present invention. The computer system in the first embodiment includes, as a plurality of computer modules, one system module 10 and n (where n satisfies $1 \leq n \leq N$) peripheral modules 20 (also denoted by 20-1 to 20-$n$ by adding indexes according to the number of peripheral modules 20). In this case, "N" indicates the maximum number of connected peripheral modules as defined by the computer system.

Figure 2:
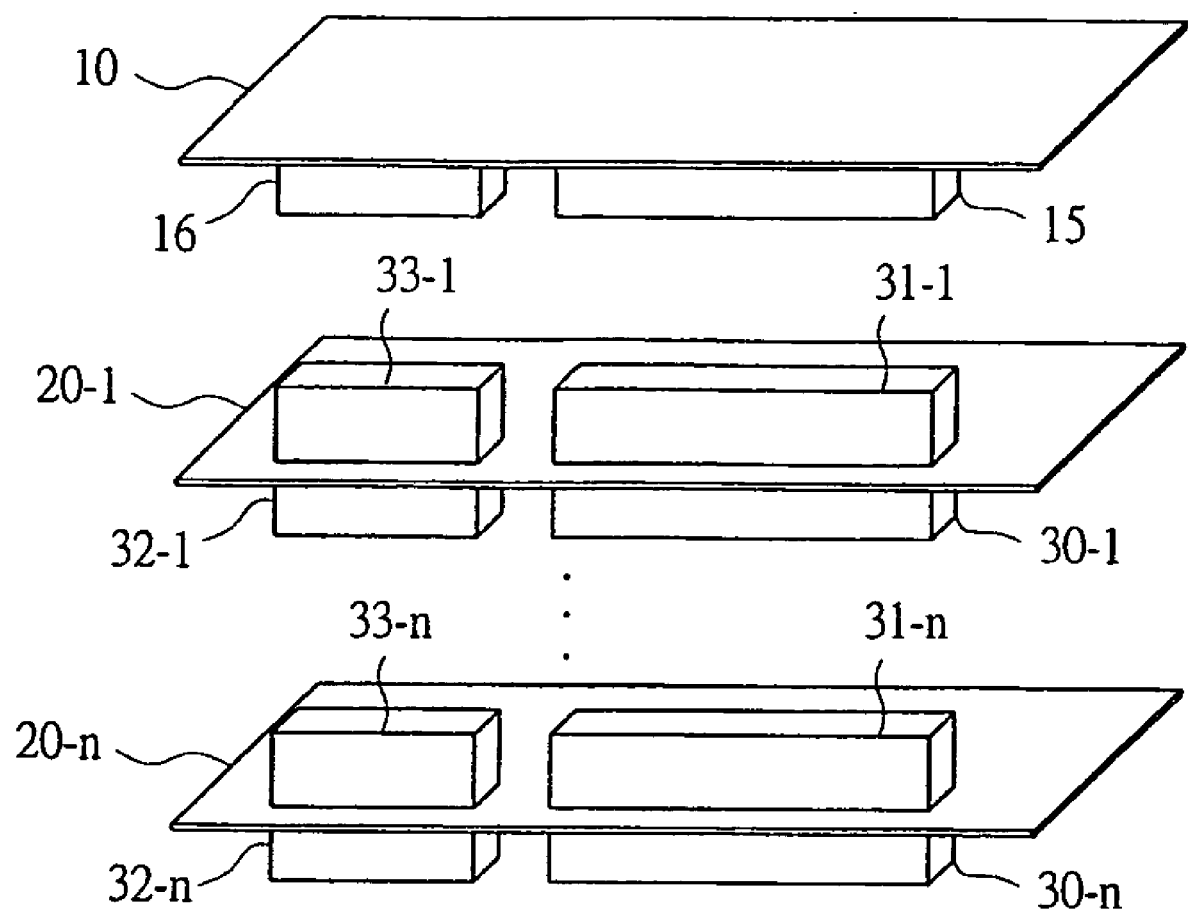
FIG. 2 is a view showing one example of physical connection in the computer system according to the first embodiment of the present invention.

FIG. 2 shows one example of physical connections relating to connections among the system module 10 and the peripheral modules 20-1 to 20-$n$. The system module 10 is connected to the peripheral modules 20 by bus connectors 15 and 31 as well as position information connectors 16 and 33. Furthermore, the peripheral modules 20 are connected to one another by bus connectors 30 and 31 as well as position information connectors 32 and 33.

FIG. 2 shows that the bus connector 15 is different from the position connector 16. However, even if both connectors are formed integrally, advantages of the present invention can be attained. The same is true for the other combinations of connectors.

Referring back to FIG. 1, the configuration of the computer system will be described. The system module 10 includes an interrupt manager 11, a clock generator 12, an arbiter 13, and a position configuration unit 14. The interrupt manager 11, the clock generator 12, the arbiter 13, and the position configuration unit 14 receive or output bus resource signals (br1 to brM, bg1 to bgM, ck1 to ckN, and ir1 to irL) and a position identification signal (posX), respectively. In this configuration, the interrupt manager 11, the clock generator 12, and the arbiter 13 function as bus resource managing means, and the position configuration unit 14 functions as position configuring means.

In FIG. 1, arrows and rhombi added for the bus resource signals and the position identification signal indicate logical directions of the signals in connected portions of the connectors for helping understand the invention, i.e., are objects to be electrically connected merely.

In the specification, driving a signal to an effective potential will be referred to as "assert", and driving a signal to an ineffective potential will be referred to as "negate". For example, "asserting a negative-true logic signal" means driving the signal up to a low potential (denoted by "Low" or "0"), and "negating a signal" means driving the signal to a high potential (denoted by "High" or "1").

The interrupt manager 11 has a function to process the interrupt signals ir1 to irL reported on a bus. The number L of interrupt signals can be arbitrarily set and may not always be the same as the maximum number N of peripheral modules 20 defined by the computer system. For example, a technique for sharing interrupt signals among a plurality of devices on a bus is disclosed in Non-patent Document 2 as described above. If detecting that an interrupt signal on the bus is asserted, the interrupt manager 11 notifies a processor (not shown) on a corresponding module of occurrence of an interrupt. Generally, the processor identifies a cause for occurrence of the interrupt and performs a processing according to the cause of the interrupt.

The clock generator 12 generates clocks for synchronizing data transfer among devices connected to the bus, and drives the clocks on the bus with predetermined accuracy. For example, on the PCI bus, it is necessary to separately supply clocks per device and set a phase difference among the clocks to fall within 2 ns at a bus clock frequency of 33 MHz. Due to this, each peripheral device needs to selectively use the clocks supplied thereto according to a distance from the peripheral device. The clock generator 12 in the first embodiment outputs as many N signals ck1 to ckN as the maximum number of peripheral devices 20 in order to distribute clocks to devices (not shown) present in the respective peripheral modules 20.

The arbiter 13 has a function to manage a bus ownership. The arbiter 13 receives bus request signals br1 to brM and validates only one of bus grant signals bg1 to bgM.

The number M of the bus request/bus grant signals is set to satisfy $0 \leq M \leq N$. Namely, if one device is present per peripheral module, the number M of bus request signals for requesting the bus ownership can be set smaller than the maximum number N of peripheral modules connectable to the bus.

To arrow one device to start data transfer using the bus, the arbiter 13 allocates a bus ownership to only one device. A device intends to use the bus transmits a bus use request to the arbiter 13 using a bus request signal. Then, the arbiter 13 decides priorities of the devices that request use of the bus and asserts a bus grant signal for the device having the highest priority. An example of an algorithm for deciding priorities include round-robin algorithm and fixed-priority algorithm.

The position configuring unit 14 has a function to notify the each peripheral module 20 of a physical position of the peripheral module 20 from the system module 10. The peripheral module 20 can know its physical position from the position identification signal posX outputted from the position configuration unit 14. Since the position configuration unit 14 and a position identification unit 25 of each peripheral module 20 need to operate before clocks are decided, they operate independently of the bus clocks. The position configuration unit 14 will be described later in detail.

A configuration of each peripheral module 20 will next be described. Each peripheral module 20 includes an interrupt selector 21, a cock selector 22, an arbitration signal selector 23, a resource decision unit 24, and the position identification unit 25. In this configuration, the interrupt selector 21, the clock selector 22, and the arbitration signal selector 23 function as resource selecting means, the resource decision unit 24 functions as resource deciding means, and the position identification unit 25 functions as position identification means. Configurations of these constituent elements will be described later in detail. Here, functions of the respective constituent elements and the relation among them will be briefly described.

The position identification unit 25 identifies a physical position of the module at which the position identification unit 25 itself exists based on an input from the position identification signal posX, and outputs the position information 27. The resource decision unit 24 has a function to output resource selection signals 26 according to position information 27.

The interrupt selector 21 has a function in which an interrupt signal irS generated on the peripheral module 20 is outputted to one of the interrupt signals ir1 to irL on the bus according to the resource selection signal 26.

The clock selector 22 has a function to select one of the clocks ck1 to ckN on the bus according to the resource selection signals 26, and to output the selected clock signal to a clock signal ckS used by a device (not shown) on the peripheral module which includes the clock selector 22.

The arbitration signal selector 23 has a function in which a bus request signal brS from the device on the peripheral module which includes the arbitration signal selector 23 is outputted to any one of the bus request signals br1 to brM on the bus according to the resource selection signals 26 and one of the bus grant signals bg1 to bgM on the bus is selected to output a bus grant signal bgS to the device on the peripheral module which includes the selector 23.

Operations performed by the respective constituent elements will be next described with reference to FIG. 1. It is assumed herein that the system module 10 and the n peripheral modules 20-1 to 20-$n$ are assembled in advance as shown in FIG. 2.

When these computer modules start, the position configuration unit 14 and the position identification unit 25 included in each peripheral module 20 cooperate to notify the resource decision unit 24 in each peripheral module 20 of the position information 27. Since the position information 27 is information on a position at which each peripheral module 20 is implemented, the position information 27 is determined exclusively for each peripheral module 20. The resource decision unit 24 notifies the interrupt selector 21, the clock selector 22, and the arbitration signal selector 23 of the resource selection signals 26 according to the position information 27. The bus device (not shown) implemented in each peripheral module 20, in particular, cannot operate if the clock ckS is not supplied thereto. Due to this, the bus device is configured to be able to operate without depending on the clock ckS until the clock ckS is determined by the clock selector 22. The interrupt selector 21, the clock selector 22, and the arbitration signal selector 23 connect a signal line on the bus and a signal line in the peripheral module which includes them according to the resource selection signal 26. By doing so, each peripheral module 20 autonomously decides bus resources (an interrupt, a clock, and a bus arbitration signal) to be used in the peripheral module according to its position from the system module 10.

According to the first embodiment as described above, even if the respective peripheral modules 20 are equal in circuit configuration, the peripheral module 20 can exclusively decide bus resources according to its position from the system module 10. It is, therefore, possible to avoid miss configurations such as duplicate configurations and improbable configurations that may possibly occur if the bus resources are configured manually. Furthermore, according to the first embodiment, in order that the stack bus system can be automatically configured, it is possible to construct a computer system at a required minimum size while ensuring expandability and convenience. Moreover, since manual configuration operation can be eliminated, the cost of assembling the computer system can be reduced.

Figures 3A, 3B:
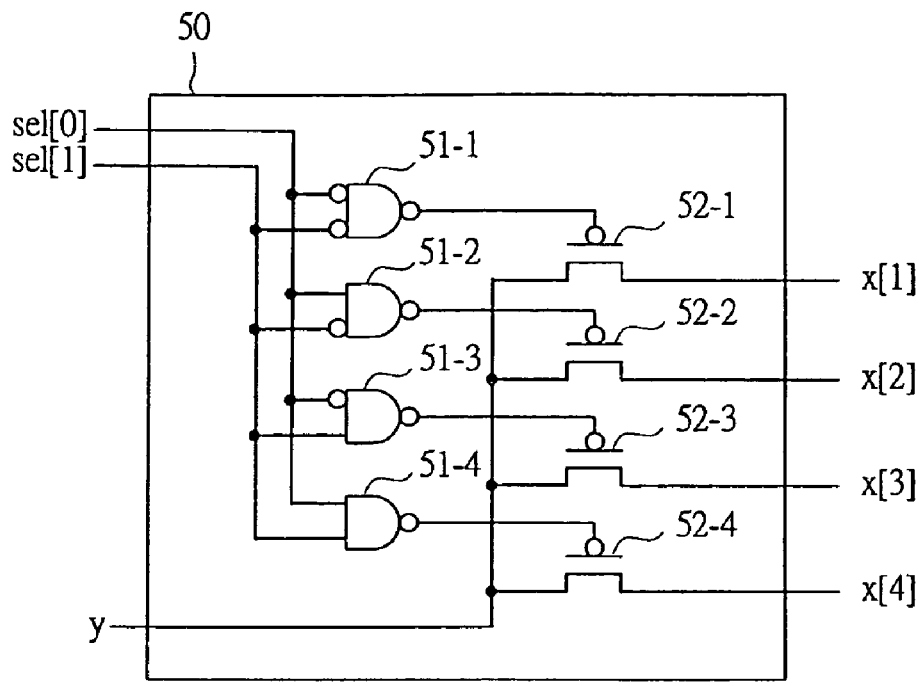
FIG. 3A is a view showing one example of a basic circuit constituting a signal selector in the computer system according to the first embodiment of the present invention.
FIG. 3B is a view showing one example of a function of the basic circuit shown in FIG. 3A.

FIG. 3A is a view showing an example of a basic circuit that constitutes a signal selector in the computer system according to the first embodiment.

By way of example, FIG. 3A shows a circuit for selecting one of four input/output signals x[4:1] and connecting the selected input/output signal to one input/output signal y. In the specification, the maximum number N of connected peripheral modules is assumed as 4 (N=4) for convenience of the below-explained description. However, N=4 is not an upper limit of the number of connected peripheral modules in the present invention. Note that the symbol "x[4:1]" collectively represents signals "x[4]", "x[3]", "x[2]", and "x[1]" as well as order of the signals.

A selector basic circuit 50 includes selection signals sel[1:0], the input/output signal y, input/output signals x[4:0], decoder elements 51-1 to 51-4, and switching elements 52-1 to 52-4. Each switching element 52 is realized by, for example, a semiconductor switching element or a semiconductor transfer gate. Herein, there is illustrated a circuit using a MOS switch configured so that when a Low input is applied to a gate terminal, a source and a drain are made conductive therebetween. Moreover, the source and the drain of the switching element 52 are designed to be symmetric and to be able to input/output signals bi-directionally.

The selector basic circuit 50 decides which of the input/output signals x[4:1] the input/output signal y is connected to according to a combination of values capable of being taken by the selection signals sel[1:0]. A function of the selector basic circuit 50 is shown in FIG. 3B. For example, if the selection signals sel[1:0] are both 0, only the switching element 52-1 between the input/output signal y and the input/output signal x[1] is conductive. At this time, the other switching elements 52-2 to 52-4 are nonconductive, and the input/output signals x[4:2] turn into high impedance states (Hi-Z).

Figure 4A:
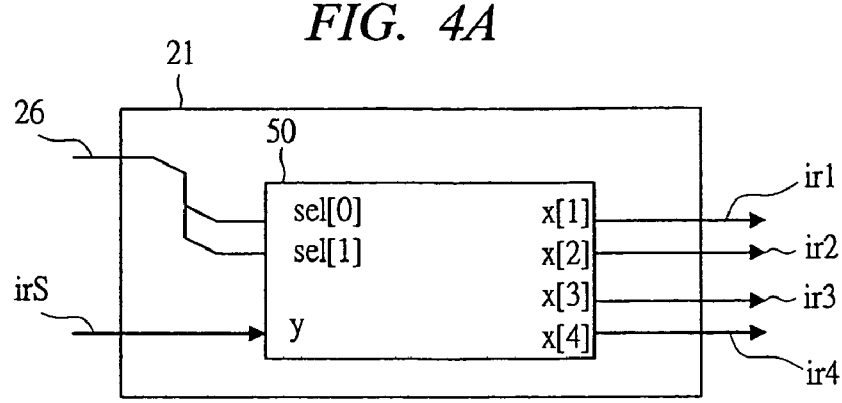
FIG. 4A is a view showing one example of a configuration of an interrupt selector in the computer system according to the first embodiment of the present invention.
Figure 4B:
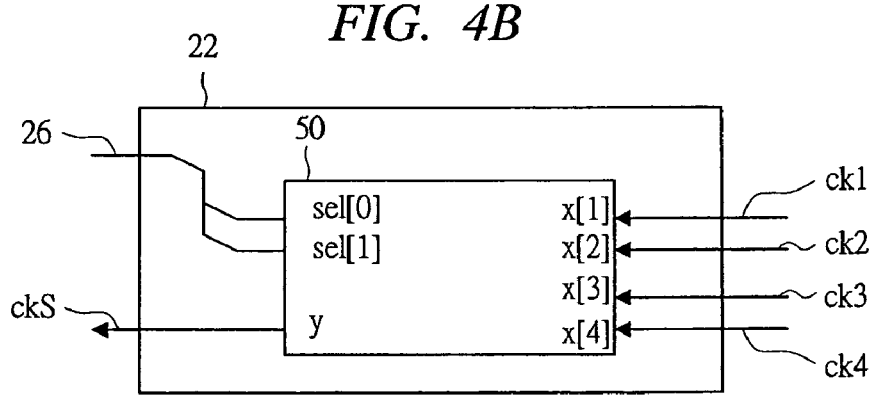
FIG. 4B is a view showing one example of a configuration of a clock selector in the computer system according to the first embodiment of the present invention.
Figure 4C:
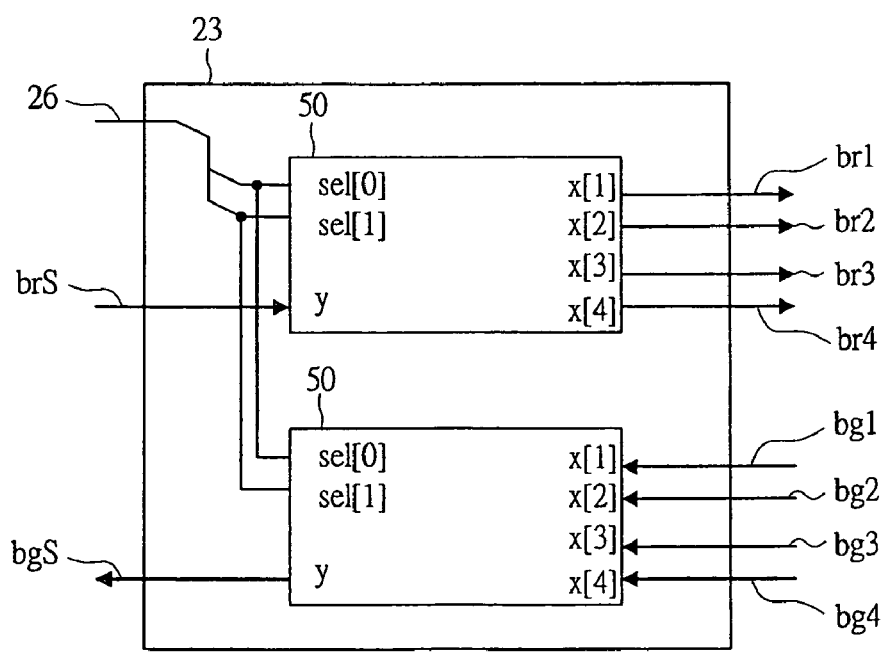
FIG. 4C is a view showing one example of a configuration of an arbitration signal selector in the computer system according to the first embodiment of the present invention.

FIGS. 4A to 4C are views showing an example of configurations of the respective selectors realized by using the selector basic circuit 50 shown in FIGS. 3A and 3B. FIG. 4A represents the interrupt selector 21; FIG. 4B represents the clock selector 22; and FIG. 4C represents the arbitration signal selector 23.

By configuring the interrupt selector 21 as shown in FIG. 4A, if the resource selection signals 26 are inputted within a range of "00" to "11", one of the interrupt signals ir1 to ir4 is selected and the interrupt signal irS is outputted to the selected interrupt signal. Likewise, by configuring the clock selector 22 as shown in FIG. 4B, one of the clock signals ck1 to ck4 is selected and the clock signal ckS is outputted to the selected clock signal. In addition, by configuring the arbitration signal selector 23 as shown in FIG. 4C, one of the bus request signals br1 to br4 is selected and the bus request signal brS is outputted to the selected bus request signal, and one of the bus grant signals bg1 to bg4 is selected and the bus grant signal bgS is output to the selected grant signal.

By the configurations as described above, in the interrupt selector 21, the clock selector 22, and the arbitration signal selector 23, the signals corresponding to the bus resources (interrupt, clock, and bus arbitration signals) can be connected to the resources in each peripheral module 20 by using the resource selection signals 26.

Figures 5A, 5B:
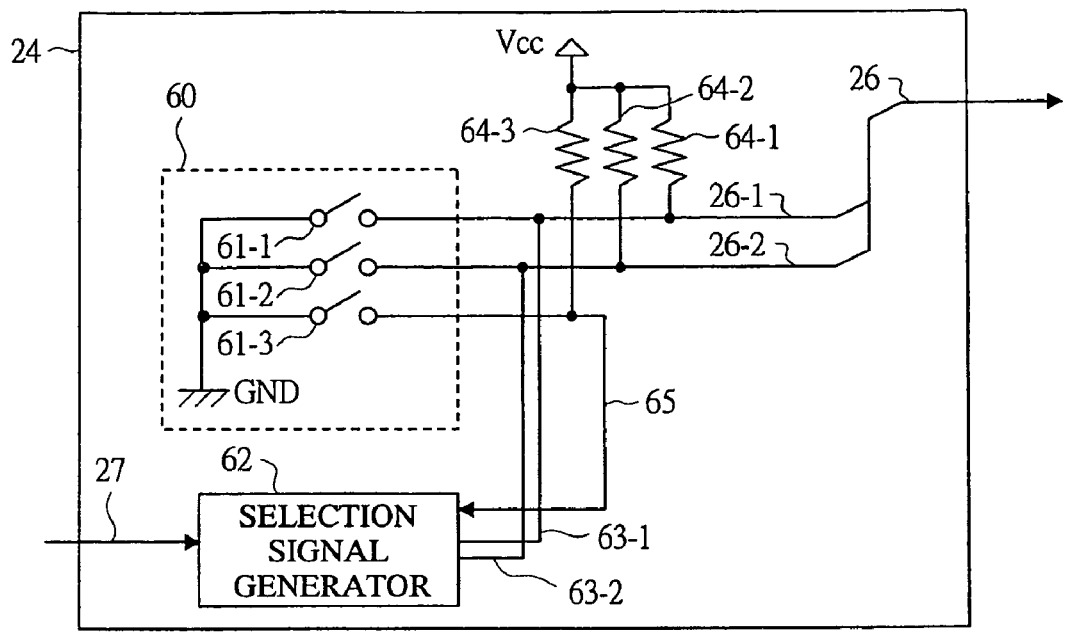
FIG. 5A is a view showing one example of a configuration of a resource decision unit in the computer system according to the first embodiment of the present invention.
FIG. 5B is a view showing one example of a function of the resource decision unit shown in FIG. 5A.

FIGS. 5A and 5B are views showing examples of a configuration and a function of the resource decision unit 24 in the computer system according to the first embodiment. FIG. 5A shows an internal configuration of the resource decision unit 24. The resource decision unit 24 includes a switch selector 60, a selection signal generator 62, and pull-up resistors 64-1 to 64-3. The reference numerals "63-1" to "63-2" denote output signals of the selection signal generator 62, and the reference numeral "65" denote a switch disable signal. The switch selector 60 includes switches 61-1 to 61-3. FIG. 5B is a truth table that represents input/output logics of the selection signal generator 62.

FIG. 5A indicates that the present invention can be carried out even if the switch selector 60 that performs manual configuration operation is included in the resource decision unit 24 in view of compatibility of the present invention with the conventional techniques. Note that the switch selector 60 is not always essential to the present embodiment and even such a configuration as not to include the switch selector 60 is applicable in the present invention.

In the first embodiment, if the switch disable signal 65 is High or the switch selector 60 is not present, the selection signal generator 62 decides a state of the resource selection signals 26. If the switch disable signal 65 is Low, the switch selector 60 decides the state of the resource selection signals 26. It is preferable that the resource selection signals 26 are driven by an open drain method due to the selection signal generator 62 or the switch selector 60. If the signal line is not driven, the resource selection signals 26 are turned High by the pull-up resistors 64 due to the selection signal generator 62 or the switch selector 60.

Referring to FIGS. 5A and 5B, operations performed by the resource decision unit 24 will be described. The voltage of the resource selection signal 26 is set to Vcc (power supply voltage) in advance by the pull-up resistors 64-1 to 64-2. Due to this, if the selection signal generator 62 does not drive the output signals 63-1 to 63-2, that is, the output signals 63-1 to 63-2 are in high impedance states, the resource selection signals 26 indicate "11" in binary.

The selection signal generator 62 decides states of the output signals 63-1 to 63-2 using the position information 27 and the switch disable signal 65. The truth table of the input/output signals of the selection signal generator 62 is shown in FIG. 5B. Values shown in FIG. 5B are all written in binary. "Hi-Z" means a state in which the selection signal generator 62 does not drive the resource selection signals 26. At this time, the resource selection signals 26 eventually take a value of "1" by the pull-up resistors 64. Note that the reference symbol "GND" means low potential (value of "0") and the reference symbol "Vcc" means high potential (value of "1").

For example, if the switch disable signal 65 is High ("1") and the position information 27 is "0010", then the selection signal generator 62 drives the output signal 63-1 to Low ("0") by an open drain buffer (not shown) and sets the output signal 63-2 to Hi-Z (does not drive the output signal 63-2 by the open drain buffer). Furthermore, if the switch disable signal 65 is Low, the selection signal generator 62 does not drive the output signals 63-1 to 63-2 irrespective of the value of the position information 27. At this time, the resource selection signal 26 is decided only by the output of the switch selector 60.

As described above, the resource decision unit 24 can automatically decide the resource selection signal 26 based on the position information 27. Furthermore, the manual configuration means such as the switch selector 60 can also coexist with the resource decision unit 24.

Figure 6:
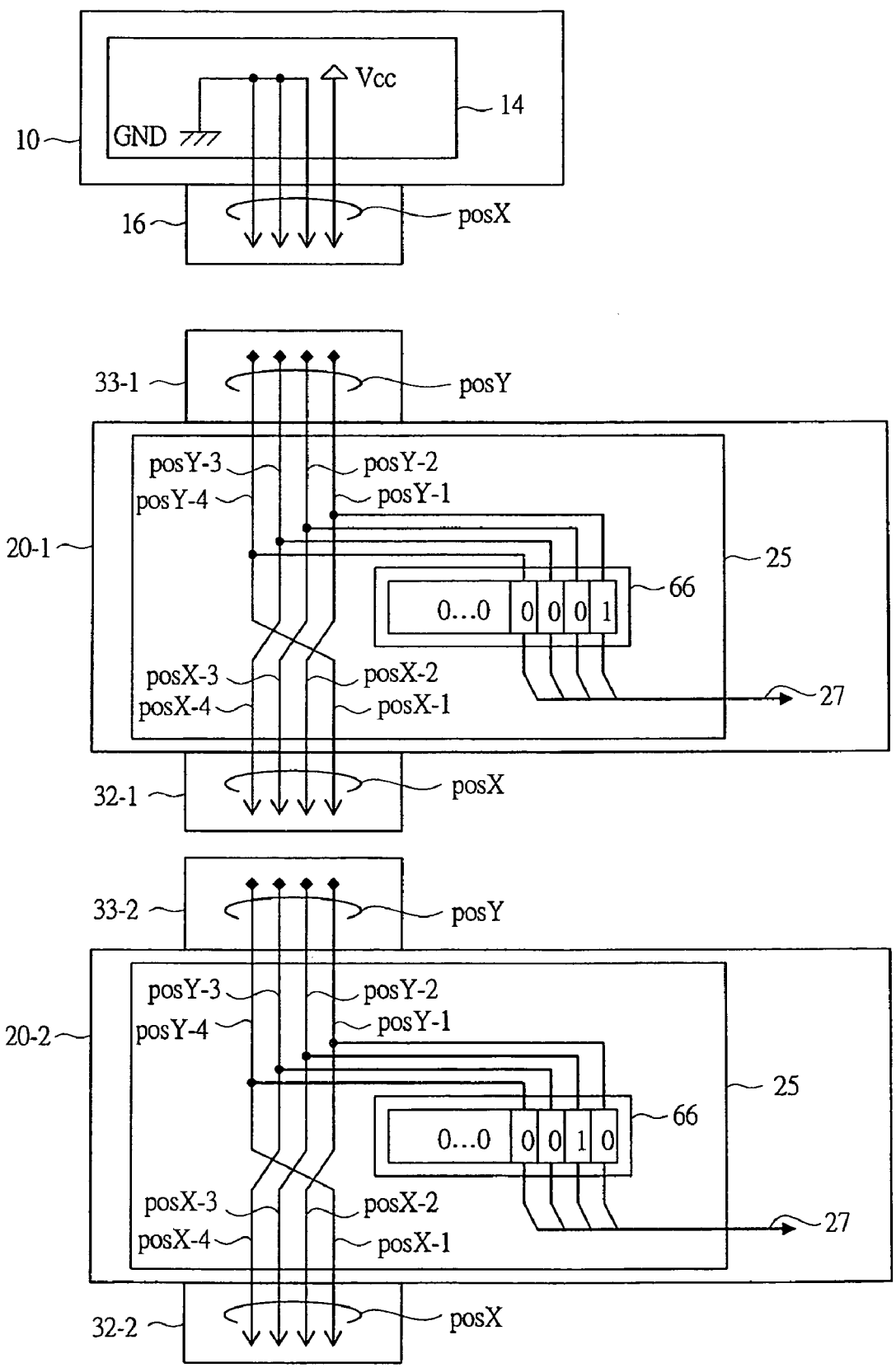
FIG. 6 is a view showing one example of a configuration related to a position configuration unit and a position identification unit in the computer system according to the first embodiment of the present invention.

FIG. 6 is a view showing one example of a configuration related to the position configuration unit 14 and the position identification unit 25 in the computer system according to the first embodiment.

The position configuration unit 14, which is a functional unit included in the system module 10, has a function to configure the position identification signals posX transmitted through the position information connector 16. FIG. 6 shows an example of setting one of the position identification information signals posX to High and setting the other signals to Low.

The position configuration unit 14 may be alternatively configured to further include a register that can be constituted by a processor (not shown) within the system module 10 and to output configuration information on this register to the position identification signals posX. In this alternative, the system module 10 can change the output of the position identification signals posX, so that the bus resources allocated to each peripheral module 20 can be changed as desired.

The position identification unit 25 has a function in which position identification signals posy receives and inputs the position identification signals posX outputted from the former module and outputs the position identification signals posX. Furthermore, the position identification unit 25, which includes a position register 66, has a function to configure the position information 27 using the position identification signals posY. In the position register 66, information on the physical position at which the pertinent peripheral module 20 is implemented is reflected. For example, by referring to the position register 66, a processor (not shown) implemented in the pertinent peripheral module 20 can perform a software processing according to the physical position.

In the present specification, the former peripheral module means a peripheral module connected through the position information connector 33. Moreover, the subsequent peripheral module means a peripheral module connected through the position information connector 32.

Referring to FIG. 6, operations performed by the position identification unit 25 will be described. In the first embodiment, the position identification unit 25 receives the position identification signals posX inputted from the subsequent peripheral module 20 by the position identification signals posY. The values of the position identification signals posY are reflected in the position register 66. At the same time, the position identification signals posY are used to configure the position information 27.

In the first embodiment, there is shown an example of the circuit that changes the value of the position identification signals posY by rotation and that outputs the position identification signals posY as the position identification signals posX. Namely, the signal posY-1 is converted into the signal posX-2, the signal posY-2 is converted into the signal posX-3, the signal posY-3 is converted into the signal posX-4, and the signal posY-4 is converted into the signal posX-1. By doing so, even if the peripheral modules 20 equal in circuit configuration are stacked, the position information 27 in the respective peripheral modules 20 can have different values.

For example, lower four bits of the position register 66 included in the peripheral module 20-1 are 0001 (binary) and the position information 27 has the same value accordingly. Meanwhile, the position information in the peripheral module 20-2 has a value of 0010 (binary).

In the first embodiment, the numbers of the position identification signals posY and posX are four, respectively. However, the present invention is not limited to the above embodiment and can expand the number of signal lines according to the number of peripheral modules.

In addition to this, means for acquiring the position information is disclosed in Japanese Patent Laid-Open Publication No. 2004-326342 by the inventors of the present invention. To acquire the position information from each peripheral module 20 using this conventional technique or a combination with this conventional technique does not limit the advantages of the present invention.

According to the first embodiment, in the computer system constituted by a plurality of peripheral modules 20, each peripheral module 20 can grasp its own physical position. Each peripheral module 20 autonomously configure the bus resources (interrupt, clock, and bus arbitration signals) using its position information, so that it is unnecessary to manually configure the bus resources. Hence, according to the first embodiment, configuration operations and costs associated with the configuration operation can be reduced. Furthermore, it is possible to prevent miss configurations.

According to the first embodiment, the system module 10 can know physical arrangement of the peripheral modules 20 and allocation of the bus resources related to the respective peripheral modules 20 by knowing algorithms for position identification and resource decision in advance. Therefore, in the system module 10, for example, the interrupt manager 11 can uniquely determine which peripheral module each of the interrupt signals ir1 to irL is transmitted from.

In the first embodiment, the examples of the bus resources have been described as the clocks, the interrupts, and the bus arbitration signals. However, an object applied to the present invention is not limited to the bus resources as described above. For example, by using the resource selection function according to the present invention, the bus resources can be autonomously used in the respective peripheral modules also for IDSEL signals on the PCI.

Second Embodiment

Figure 7:
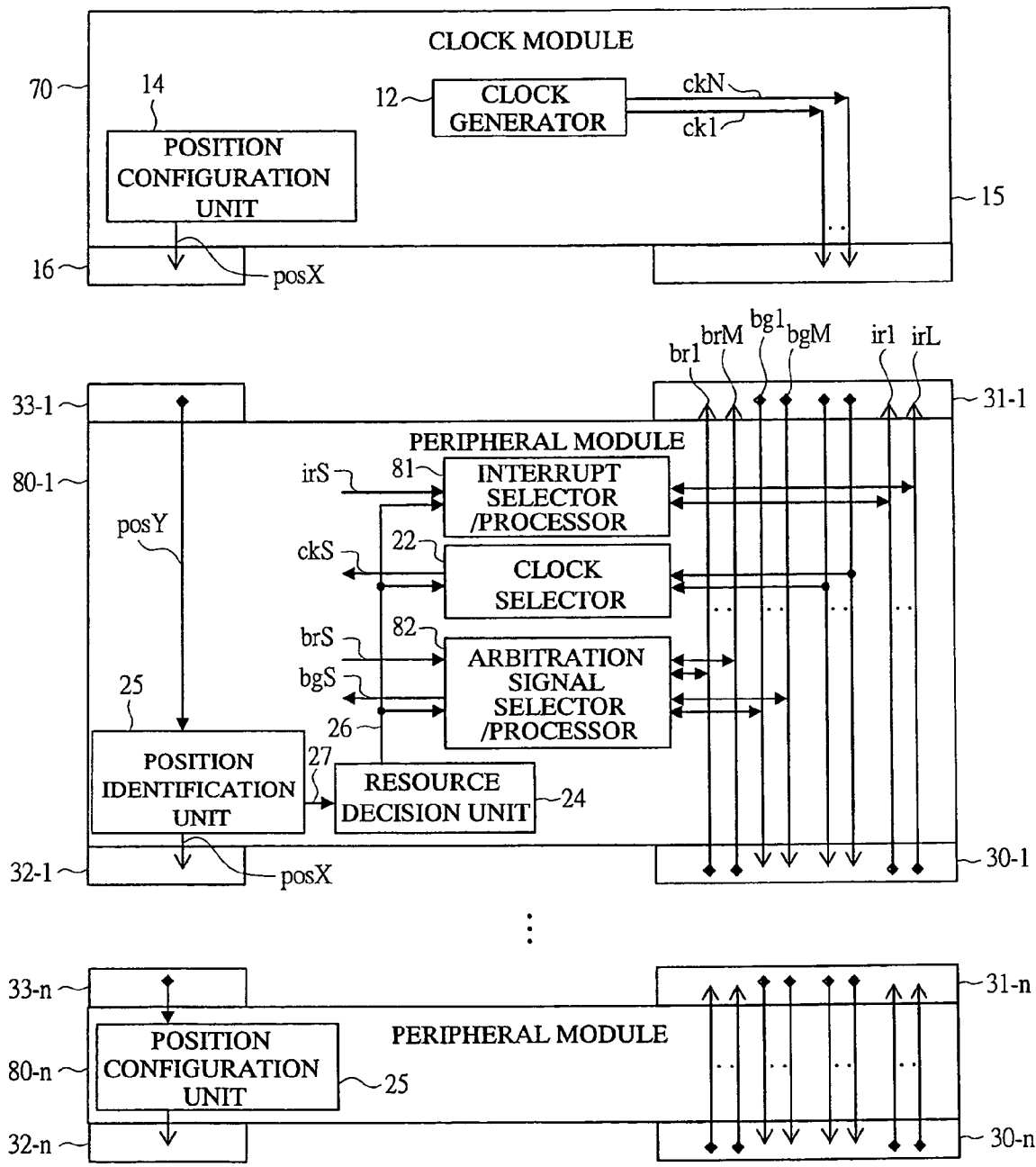
FIG. 7 is a view showing one example of a configuration of a computer system according to a second embodiment of the present invention.

FIG. 7 is a view showing one example of a configuration of a computer system according to a second embodiment of the present invention. In the second embodiment, the same constituent elements or functions as those in the first embodiment are denoted by the same reference numerals unless specified otherwise.

The computer system according to the second embodiment includes one clock module 70 and n (where n satisfies 1≦n≦N) peripheral modules 80 (also denoted by 80-1 to 80-n by adding indexes according to the number of peripheral modules 80). Herein, "N" indicates the maximum number of connected peripheral modules as defined for by the computer system.

A feature according to the second embodiment is that an interrupt processing function and a bus arbitration signal processing function are integrated into each new peripheral module 80. By providing a processor and an operating system (not shown) for allowing each peripheral module 80 to perform the interrupt processing, the peripheral module 80 can be expanded without restrictions due to presence of the system module according to the first embodiment.

The physical connection configuration of the computer system according to the second embodiment is the same as that shown in FIG. 2 except that the clock module 70 is present in place of the system module 10.

The clock module 70 includes a clock generator 12 and the position configuration unit 14. Functions of the clock generator 12 and the position configuration unit 14 are the same as those in the first embodiment.

Each of the new peripheral modules 80 includes an interrupt selector/processor 81, a clock selector 22, an arbitration signal selector/processor 82, the resource decision unit 24, and the position identification unit 25. The clock selector 22, the resource decision unit 24, and the position identification unit 25 are the same as those in the first embodiment.

The interrupt selector/processor 81 controls an input and an output of the interrupt signal according to the resource selection signals 26. Namely, according to the resource selection signals 26, the interrupt selector/processor 81 operates to determine which interrupt signal on the bus the interrupt signal irS is outputted to or whether an interrupt signal on the bus is drawn to perform an interrupt processing. The detailed configuration of the interrupt selector/processor 81 will be described later.

The arbitration signal selector/processor 82 controls an input and an output of the arbitration signal according to the resource selection signals 26. Namely, the arbitration signal selector/processor 82 operates to determine which bus request and bus grant on the bus are connected to the bus request brS and the bus grant bgS from a device (not shown) in the peripheral module 80, or to draw the bus request and the bus grant on the bus to arbitrate bus ownership according to the resource selection signals 26. The detailed configuration of the arbitration signal selector/processor 82 will be described later.

Operations performed by the respective constituent elements will be described with reference to FIG. 7. When the computer module starts, the position configuration unit 14 and the position identification unit 25 included in each peripheral module 80 cooperate to output the resource selection signals 26 similarly to the first embodiment. The interrupt selector/processor 81, the clock selector 22, and the arbitration signal selector/processor 82 connect, according to the resource selection signals 26, a signal line on the bus and a signal line in the peripheral module 80 which includes them, or they draw the signal line on the bus into the peripheral module 80 to perform any processing. By doing so, each peripheral module 80 autonomously decides the bus resources (interrupt, clock, and bus arbitration signals) to be used in the module according to its position from the clock module 70.

According to the second embodiment, in addition the advantages of the first embodiment, it is possible to make the configuration of the clock module 70 simple by using the clock module 70 in which the interrupt processing function and the arbiter are removed from the system module 10 according to the first embodiment. Therefore, the clock module 70 can be constituted solely or be incorporated into an arbitrary module (e.g., a power supply module) of the computer system. In a multiprocessor configuration in which each peripheral module 80 includes a processor, in particular, the interrupt processing function can be easily distributed to the respective peripheral modules 80, so that the computer system according to the second embodiment can easily configured.

Figure 8A:
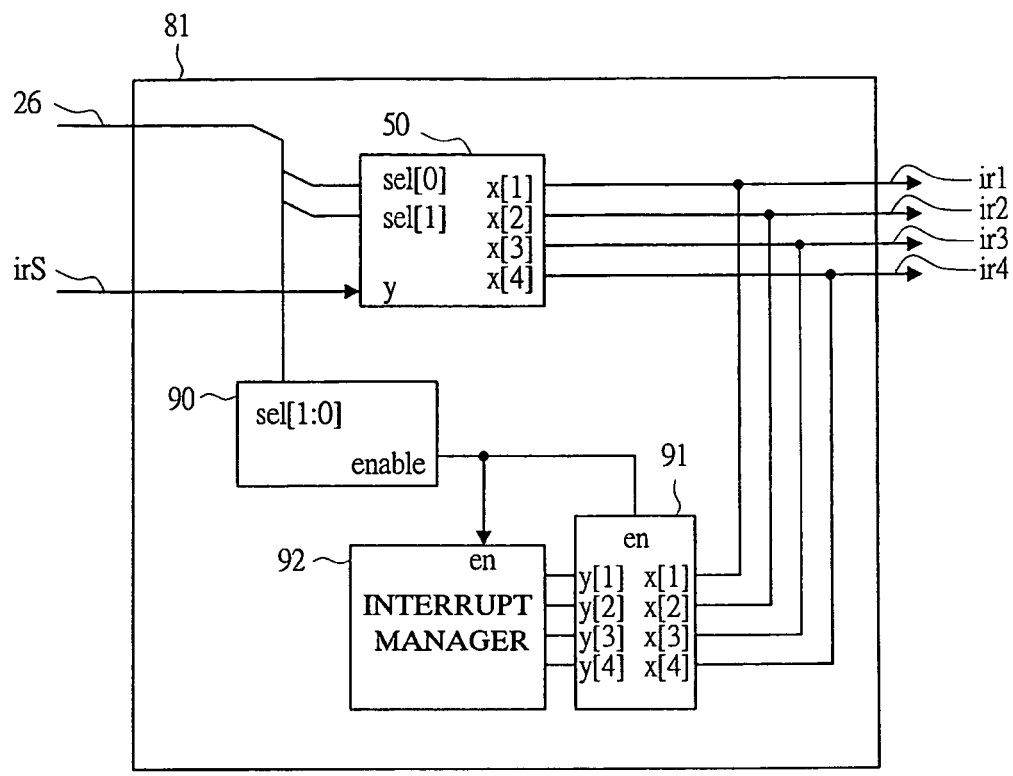
FIG. 8A is a view showing one example of a configuration of an interrupt selector/processor in the computer system according to the second embodiment of the present invention.

FIG. 8A is a view showing one example of a configuration of the interrupt selector/processor 81 in the computer system according to the second embodiment.

The interrupt selector/processor 81 includes: the selector basic circuit 50 for outputting the interrupt signal irS to the interrupt signal on the bus; an interrupt processing enabler 90 for determining whether an interrupt processing function is activated; a buffer 91 for inputting or outputting the interrupt signal on the bus; and an interrupt manager 92 for performing an interrupt processing.

Figure 8B:
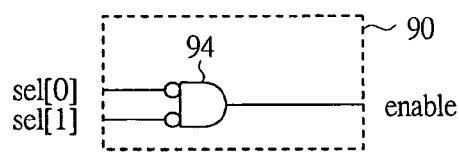
FIG. 8B is a view showing one example of a configuration of an interrupt processing enabler that constitutes the interrupt selector/processor shown in FIG. 8A.

The interrupt processing enabler 90 determines whether to enable the interrupt manager 92 is activated in response to the input of the resource selection signal 26. One example of a configuration of the interrupt processing enabler 90 is shown in FIG. 8B. FIG. 8B shows an example of a circuit in which if the resource selection signal 26, i.e., sel[1:0] is "00" (binary), "enable" turns High. In the computer system according to the second embodiment, the function of the interrupt processing enabler 90 is to activate the interrupt manager 92 in the peripheral module 80. As long as the interrupt processing enabler 90 can fulfill the function, the interrupt processing enabler 90 may not always include a NOR gate 94 as shown in FIG. 8B.

Figure 8C:
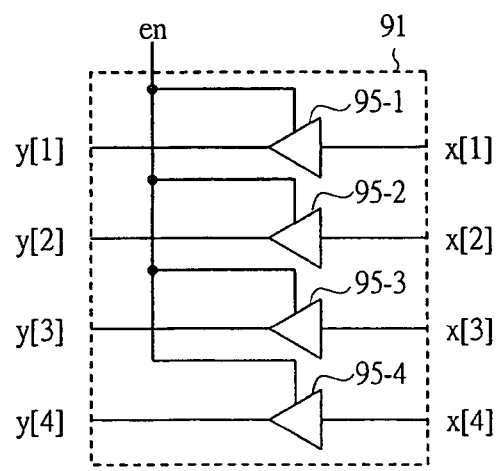
FIG. 8C is a view showing one example of a configuration of a buffer that constitutes the interrupt selector/processor shown in FIG. 8A.

FIG. 8C shows one example of a configuration of the buffer 91. FIG. 8C shows such a configuration that when High is applied to an enable terminal en, input terminals x[i] and output terminals y[i] (where i=1 to 4) are made conductive therebetween. FIG. 8C shows an example in which the buffer 91 is configured from tri-state buffers 95-1 to 95-4. As long as the buffer 91 has a function to be able to control connections between the input terminals and the output terminals by the enable terminal en, however, the buffer 91 may be constituted not by the tri-state buffers 95-1 to 95-4 but by, for example, transfer gates.

Operations performed by the interrupt selector/processor 81 will be described with reference to FIG. 8. In the second embodiment, the operations performed by the interrupt selector/processor 81 greatly differ according to whether the value of the resource selection signal 26 is "00" (binary).

If the resource selection signal 26 is "00" (binary), the interrupt selector/processor 81 activates the interrupt manager 92 to receive the interrupt signal from the bus. At this time, the interrupt processing enabler 90 applies High to the enable terminal en of the buffer 91. An instruction to perform an "interrupt enable" processing from the interrupt processing enabler 90 is given to an enable terminal en, and the interrupt manager 92 draws the interrupt signal from the bus and performs the interrupt processing. Generally, the interrupt processing is a processing for detecting whether the interrupt signal is activated and, if there is the activated interrupt signal, identify a cause of an interrupt by a processor (not shown) and performs a processing according to the cause of the interrupt.

If the resource selection signal 26 is other than "00" (binary), the interrupt selector/processor 81 outputs the interrupt signal onto the bus without activating the interrupt manager 92. At this time, the interrupt processing enabler 90 applies Low to the enable terminal en of the buffer 91. The interrupt signal on the bus, to which the interrupt signal irS from the device on the peripheral module 80 is outputted, is decided by the resource selection signal 26.

As described above, the resource selection signal 26 can be ensured to have a unique value in the computer system even if the peripheral modules 80 are equal in circuit configuration. Therefore, even if the peripheral modules equal in circuit configuration include the interrupt selectors/processors 81, each interrupt selector/processor 81 can selectively operate to determine whether to perform the interrupt processing according to the position at which the peripheral module 80 is implemented in the computer system.

Figure 9:
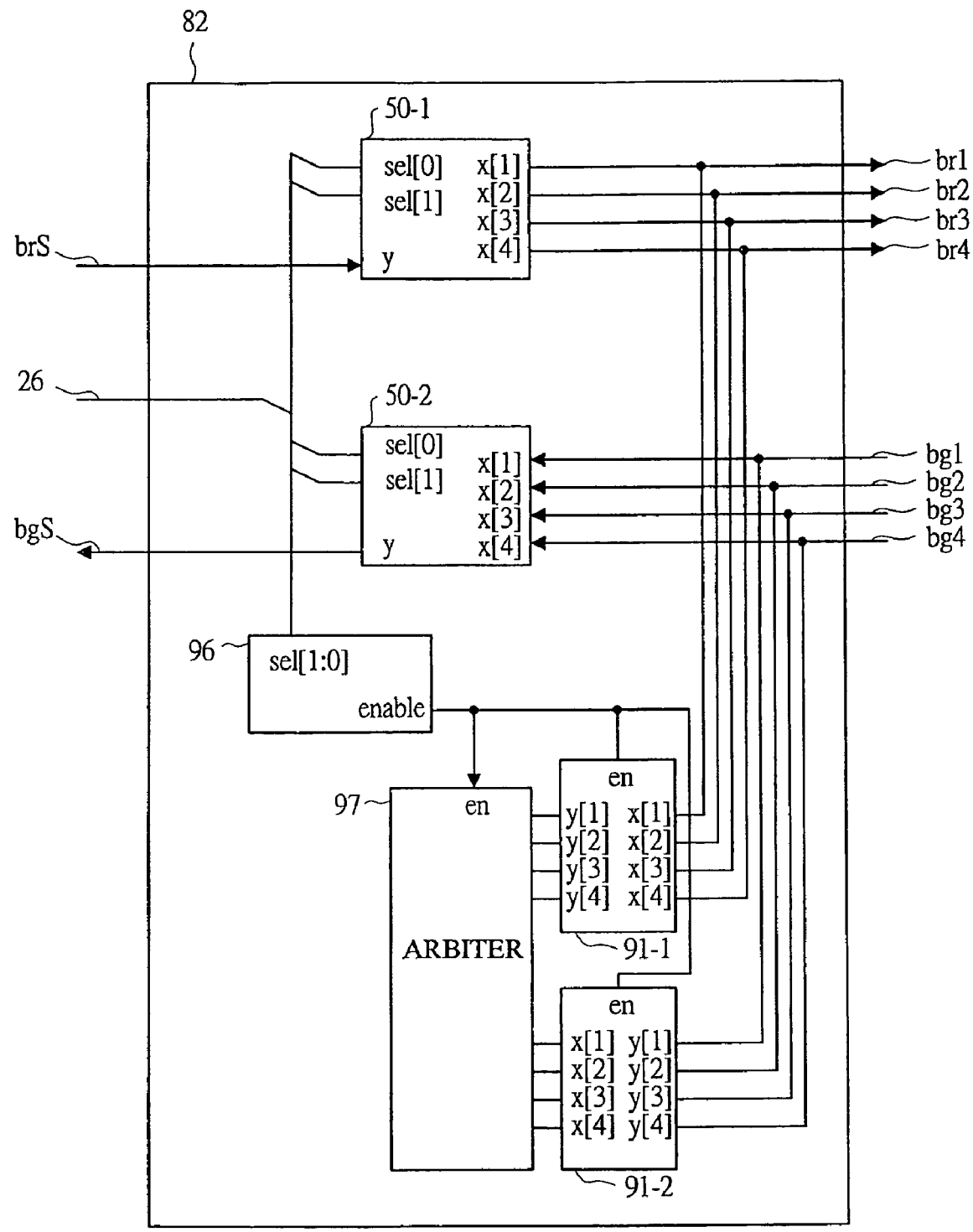
FIG. 9 is a view showing one example of a configuration of an arbitration signal selector/processor in the computer system according to the second embodiment of the present invention.

FIG. 9 is a view showing one example of a configuration of the arbitration signal selector/processor 82 in the computer system according to the second embodiment.

The arbitration signal selector/processor 82 includes selector basic circuits 50-1 and 50-2, buffers 91-1 to 91-2, an arbiter enabler 96, and an arbiter functional unit 97. The selector basic circuit 50-1 selects a connection destination of the bus request brS from among the bus request signals on the bus. The selector basic circuit 50-2 selects a connection destination of the bus grant signal bgS from among the bus grant signals on the bus. The arbiter enabler 96 determines whether to activate a bus arbiter function.

In the computer system according to the second embodiment, the function of the arbiter enabler 96 is to activate only the arbiter functional unit 97 in the peripheral module 80. Due to this, the arbiter enabler 96 may have the circuit configuration as shown in, for example, FIG. 8B. The second embodiment will be described on the premise that the arbiter enabler 96 has the circuit configuration as shown in FIG. 8B.

The arbiter functional unit 97 has a function as the arbiter 13 in the first embodiment. The arbiter functional unit 97 has, in addition to the function of the arbiter 13, such a feature as to have the enable terminal en for giving an instruction of whether to activate the arbiter function. The arbiter functional unit 97 has a function to, when High is applied to the enable terminal en, activate the bus arbiter function, select one bus request signal from a device to be asserted, and output a bus grant signal.

Operations performed by the arbitration signal selector/processor 82 will be described with reference to FIG. 9. In the second embodiment, the operations performed by the arbitration signal selector/processor 82 greatly differ according to whether the value of the resource selection signal 26 is "00" (binary) similarly to the interrupt selector/processor 81.

If the resource selection signal 26 is "00" (binary), the arbitration signal selector/processor 82 activates the arbiter functional unit 97 to receive the bus request signal from the bus. At this time, the arbiter enabler 96 applies High to enable terminals en of the buffers 91-1 to 91-2. An instruction to perform an "arbiter enable" processing from the arbiter enabler 96 is given to the enable terminal en, and the arbiter functional unit 97 draws the bus request signal from the bus and performs an arbiter processing. When the arbiter functional unit 97 decides the device given the bus ownership according to a predetermined algorithm, the arbiter functional unit 97 selects and asserts one pertinent bus grant signal.

If the resource selection signal 26 is other than "00" (binary), the arbitration signal selector/processor 82 outputs the bus request signal onto the bus without activating the arbiter functional unit 97. At this time, the arbiter enabler 96 applies Low to the enable terminals en of the buffers 91-1 to 91-2. The bus request signal on the bus, to which the bus request signal brS from the device on the peripheral module 80 is outputted, is decided by the resource selection signals 26. The same thing is true for the bus grant signal.

Thus, the arbitration signal selector/processor 82 can selectively operate to determine whether to perform the bus arbitration processing according to the position at which the peripheral module 80 is implemented in the computer system, even if the peripheral modules 80 are equal in circuit configuration.

In the second embodiment, signals input/output to or from the interrupt manager 92 and the arbiter functional unit 97 except for the enable terminals en have been described as signals from the bus. However, the present invention is not limited thereto. Generally, it is desirable to make effective use of pins that constitute the bus connectors and of bus resources. For example, the interrupt signal from the device on the pertinent peripheral module 80 can directly inputted to the interrupt manager 92 by appropriately configuring the input of the interrupt manager 92, instead of being temporarily outputted onto the bus and then drawn. In this case, it is possible to make most us of the interrupt signal on the bus.

Third Embodiment

Figure 10:
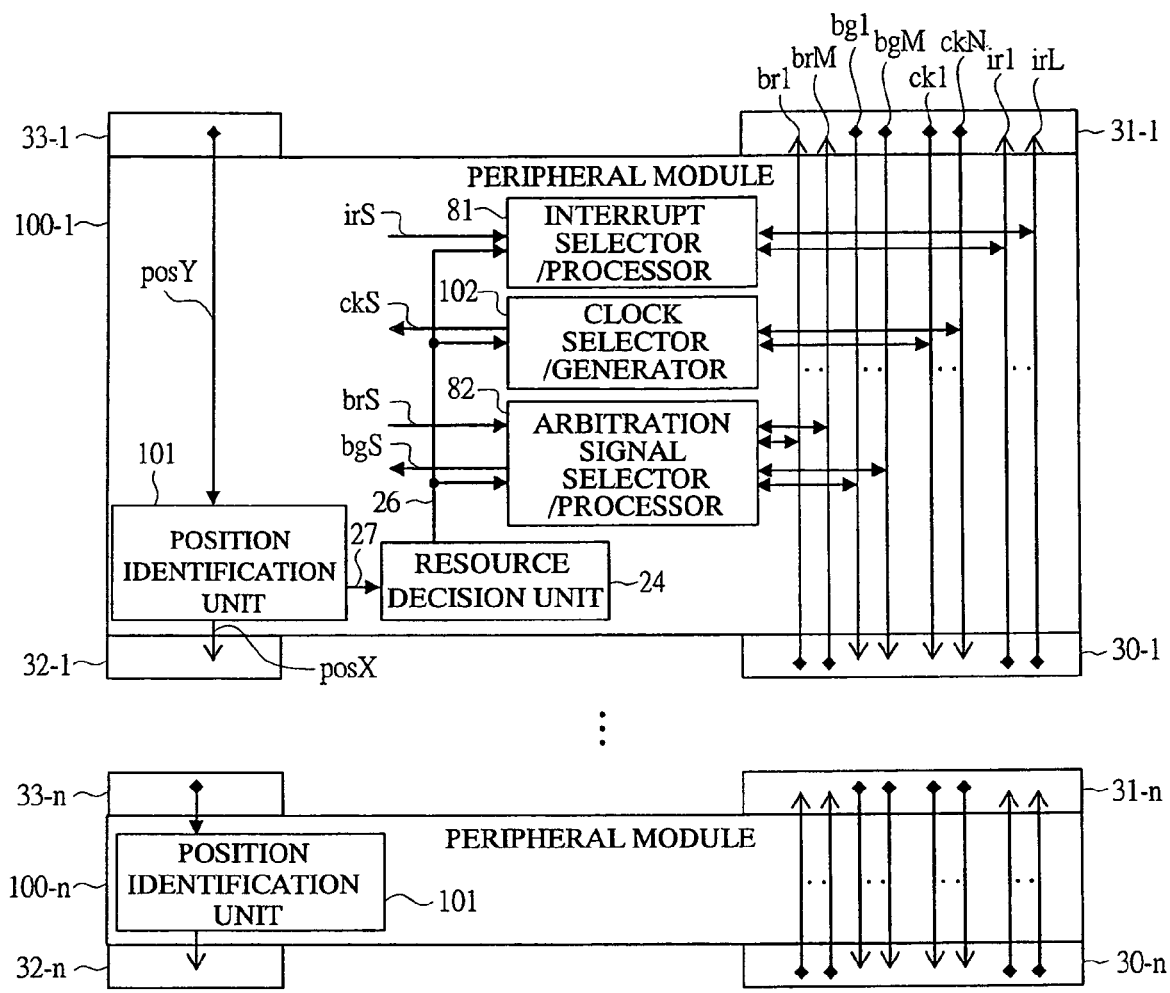
FIG. 10 is a view showing one example of a configuration of a computer system according to a third embodiment of the present invention.

FIG. 10 is a view showing one example of a configuration of a computer system according to a third embodiment of the present invention. In the third embodiment, the same constituent elements or functions as those in the first and second embodiments are denoted by the same reference symbols unless specified otherwise.

The computer system according to the third embodiment includes n (where n satisfies $1 \leq n \leq N$) peripheral modules 100 (also denoted by 100-1 to 100-n by adding indexes according to the number of peripheral modules 100). "N" indicates the maximum number of connected peripheral modules as defined by the computer system.

A feature of the computer system according to the third embodiment is that all bus-resource processing functions are integrated into each new peripheral module 100. By providing a processor for allowing each peripheral module 100 to perform the interrupt processing, an operating system (not shown), and a clock generator, the peripheral module 100 can be expanded without restrictions due to presence of the system module 10 according to the first embodiment or the clock module 70 according to the second embodiment.

The physical connection configuration of the computer system according to the third embodiment is the same as that shown in FIG. 2 except that the system module 10 is not present.

Each of the new peripheral modules 100 includes the interrupt selector/processor 81, a clock selector/generator 102, the arbitration signal selector/processor 82, the resource decision unit 24, and a position-identification unit 101. The resource decision unit 24 is the same as that in the first embodiment. The interrupt selector/processor 81 and the arbitration signal selector/processor 82 are the same as those in the second embodiment.

The position identification unit 101 has almost the same function as that of the position identification unit 25 according to the first embodiment. The position identification unit 101 has the feature that its own position is identified even without the position configuration unit 14. The detailed configuration of the position identification unit 101 will be described later.

The clock selector/generator 102 controls an input and an output of the clock signal according to the resource selection signal 26. Namely, the clock selector/generator 102 operates, according to the resource selection signal 26, to determine which of the clock signals ck1 to ckN on the bus the clock signal ckS is connected to or whether to drive the clock signal on the bus. The detailed configuration of the clock selector/generator 102 will be described later.

Operations performed by the respective constituent elements of each peripheral module 100 will be described with reference to FIG. 10. When the computer system constituted by the peripheral modules 100 starts, the position identification unit 101 cooperates with other position identification units to output the resource selection signals 26. The interrupt selector/processor 81, the arbitration signal selector/processor 82, and the clock selector/generator 102 connect, according to the resource selection signal 26, a signal line on the bus and a signal line in each peripheral module 100 which includes them, or draw the signal line on the bus into the pertinent peripheral module 100 to perform any processing. By doing so, each peripheral module 100 can autonomously decide the bus resources (interrupt, clock, and bus arbitration signals) to be used in the module according to its physical position in the computer system.

According to the third embodiment, in addition to the advantages of the first and second embodiments, the computer system can be constructed by merely combining the same peripheral modules. Therefore, the computer system can be constructed while ensuring expandability without the need to prepare different modules such as the peripheral modules, system modules, or clock modules. Generally, although only one system module or clock module is sufficiently to be included in the computer system, a plurality of peripheral modules is implemented in the computer system. According to the third embodiment, since the computer system can be constituted only by the peripheral modules, it is expected to attain mass-production efficiency in manufacturing the peripheral modules.

Figures 11A, 11B, 11C:
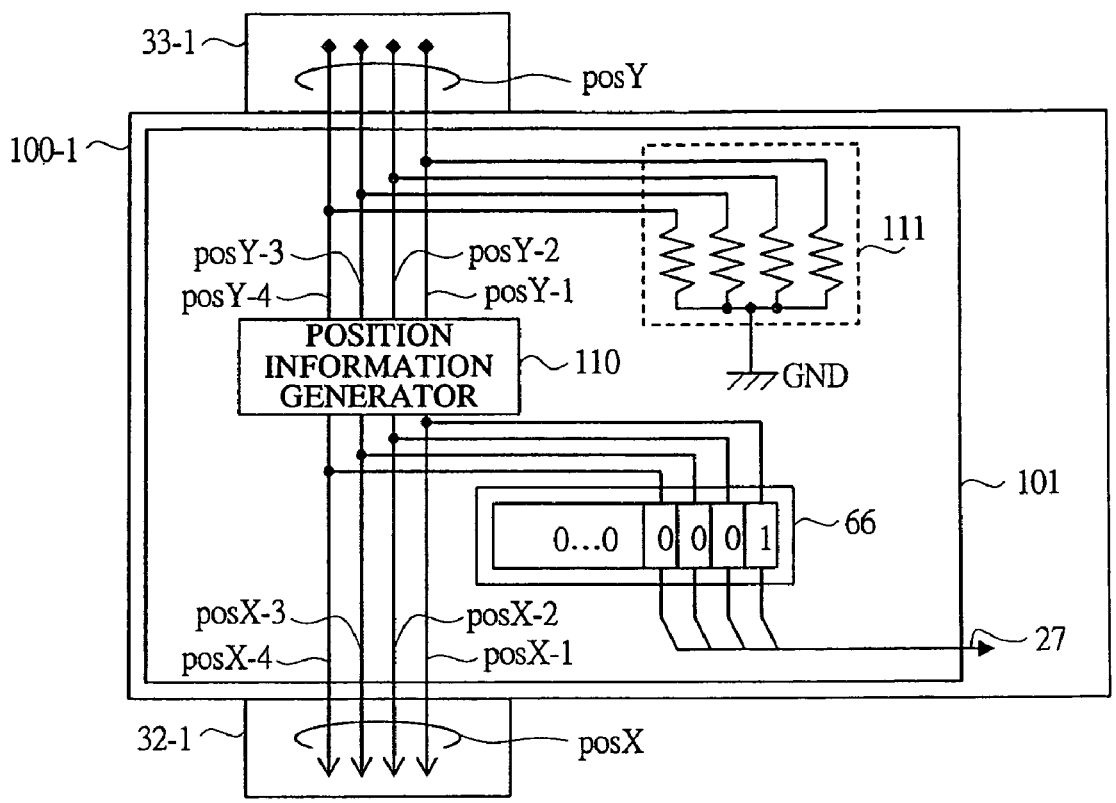
FIG. 11A is a view showing one example of a configuration of a position identification unit in the computer system according to the third embodiment of the present invention.
FIG. 11B is a view showing one example of a function of the position identification unit shown in FIG. 11A.
FIG. 11C is a view showing one example of a function of the position identification unit shown in FIG. 11A.

FIG. 11A is a view showing one example of a configuration of the position identification unit 101 in the computer system according to the second embodiment. The position identification unit 101 includes the position register 66, a position information generator 110, and a resistor 111. The position identification unit 101 has a function to receive the position identification signals posY and to output the position information 27 and the position identification signals posX.

The resistor 111 is used to keep signals in specified states when the position identification signals posY are not driven. In the third embodiment, all the position identification signals posY are connected to GND through pull-down resistors. Therefore, if the position identification signals posY are not configured by the former peripheral module, all the position identification signals posY are set to Low.

The position identification unit 101 outputs its own position to the position register 66 based on values of the position identification signals posY, and drives the position identification signals posX which are notified of the subsequent peripheral module.

FIG. 11B shows one example of a function of the position identification unit 101. For example, if the input position identification signals posY[4:1] are "0001" (binary), "0010" (binary) are outputted to the output position identification signals posX[4:1]. If the former peripheral module is not present, the input position identification signals posY[4:1] become "0000" (binary) and accordingly the output position identification signals posX[4:1] become "0001" (binary).

Meanwhile, both the position identification signals posY and posX are expressed by effective values at positions at which "1" is present so far. However, the position identification signals posY and posX can be expressed by binary codes. FIG. 11C shows one example of a-function of the position identification unit 101 in this alternative. In FIG. 11C, positions of the peripheral modules are expressed by binary codes. By so configuring, it is possible to notify position information by using a group comprising fewer position identification signals. In this case, the generation logic of the selection signal generator 62 in the resource decision unit 24 requires adapting for the group.

Figure 12:
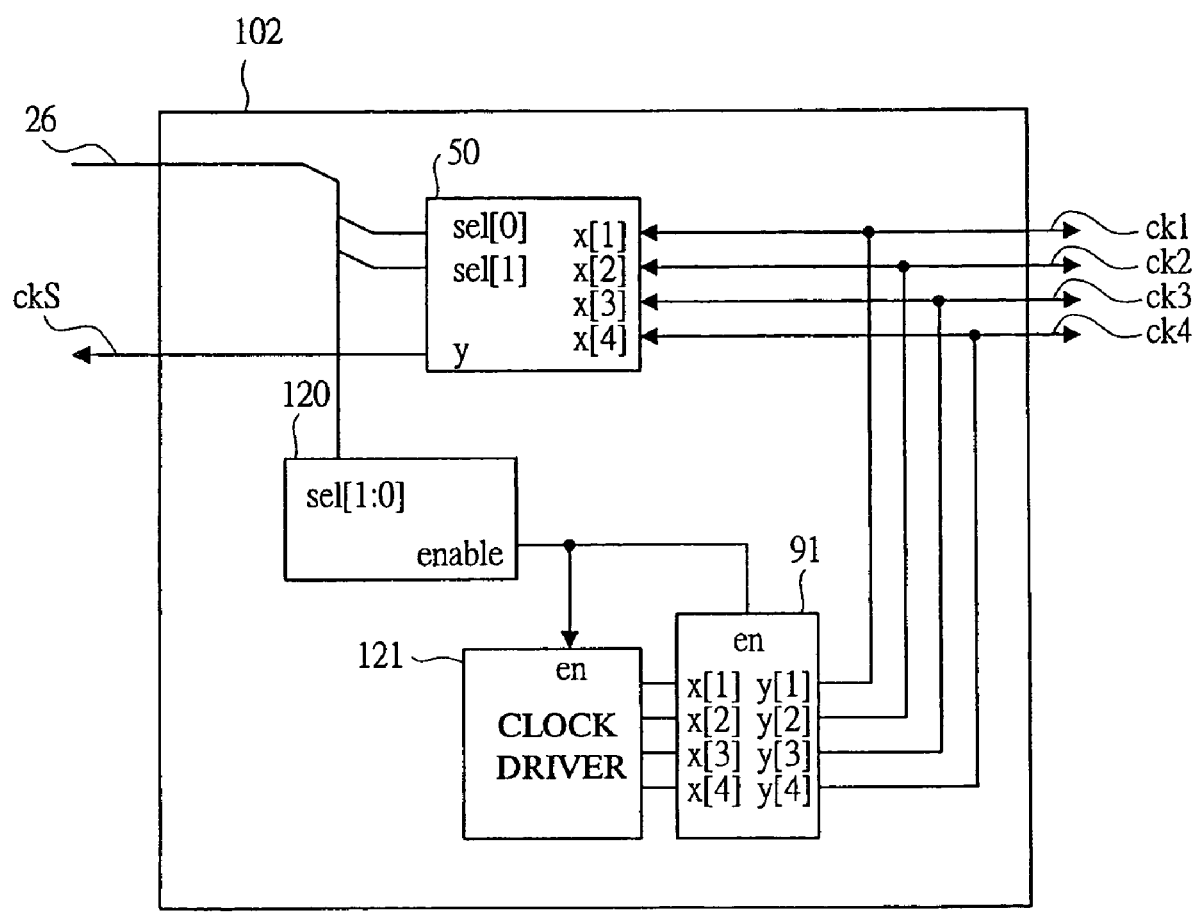
FIG. 12 is a view showing one example of a configuration of a clock selector/generator in the computer system according to the third embodiment of the present invention.

FIG. 12 is a view showing one example of a configuration of the clock selector/generator 102 in the computer system according to the third embodiment.

The clock selector/generator 102 includes the selector basic circuit 50 for selecting the connection destination of the clock ckS used in the module from among the clock signals on the bus, a clock driver 121 that generates clocks, a clock enabler 120 that determines whether to activate the clock driver 121, and a buffer 91 for outputting the clocks.

The selector basic circuit 50 and the buffer 91 each have the same functions as those stated above. The clock enabler 120 determines whether to enable the clock driver 121 in response to the input of the resource selection signal 26. For example, to activate the clock driver 121 when the resource selection signal 26 is "00" (binary), the clock enabler 120 can be configured in the same manner as that shown in FIG. 8B.

The clock driver 121 includes an enable terminal en. If High is applied to the enable terminal en, the clock driver 121 outputs clock signals.

Operations performed by the clock selector/generator 102 will be described with reference to FIG. 12. In the third embodiment, the operations performed by the clock selector/generator 102 greatly differ according to whether the resource selection signal 26 is "00" (binary).

If the resource selection signal 26 is "00" (binary), the clock selector/generator 102 activates the clock driver 121 to drive the clock signals on the bus. At this time, the clock enabler 120 applies High to the enable terminal en of the buffer 91. When an instruction to perform a "clock drive enable" processing from the clock enabler 120 is given to the enable terminal en, the clock driver 121 drives the clocks on the bus. The clock ckS used by the device in each of the peripheral modules 100 is selected from among the clocks outputted onto the bus according to the resource selection signals 26, and is connected to the selected clock.

If the resource selection signal 26 is a value other than "00" (binary), the clock selector/generator 102 inputs the clock signals on the bus without activating the clock driver 121. The clock ckS used by the device in the peripheral module 100 is selected from among the clock signals on the bus according to the resource selection signal 26, and is connected to the selected clock on the bus.

In the third embodiment, the clock ckS is always selected from among the clock signals on the bus and is connected to the selected clock signal. Alternatively, if the clock driver 121 is activated in order to increase the number of peripheral modules connected to one another on the bus, the clock signal to be allocated to the clock ckS may be directly connected to the clock ckS without drawing the clock signal from the clock driver 121 onto the bus. In this case, it goes without saying that it is necessary to consider drawing directly the signal so as to be equal in signal delay to other clock signals to be drawn onto the bus. By doing so, the clock signals drawn onto the bus can be used as clocks to be transmitted to all the other peripheral modules, thereby making it possible to utilize effectively the signals on the bus. At the same time, the number of connectable peripheral modules can be increased up to the number of clock signals on the bus.

The structure of the position identification unit 101 described in the third embodiment is not limited to the third embodiment and may be applied to the position identification units 25 of the first and second embodiments. In this case, the position configuration unit 14 in the system module 10 or the clock module 70 can be eliminated.

As described above, the inventions made by the present inventors have been described specifically based on the embodiments. However, needless to say, the present invention is not limited to the embodiment and may be variously changed or modified within the scope of not departing from the gist thereof.

The present invention relates to a computer system configured by a plurality of computer modules connected to one another through a bus and, more specifically, to a technique effectively applicable to a method and an apparatus configuration of adjusting a bus resource such as a bus clock and an interrupt in a stack bus system in which a system module, a clock module, a periphery module are stacked and connected to one another.

What is claimed is:

1. A computer system comprising a plurality of computer modules connected to one another in a stack, via a stacked interconnection of the computer modules to one another using stackable connectors including a system bus having bus resources including at least one of interrupts and clocks, wherein a first computer module among the plurality of computer modules includes position configuration means for outputting physical position configuration information useable by other computer modules in the stack for determining a physical stack position of the other computer modules in the stack in relation to the first computer module, and includes bus resource managing means, a second computer module among the plurality of computer modules includes position identifying means for identifying a unique physical stack position of the second computer module in the stack in relation to the first computer module, on a basis of the position configuration information received from the first computer module, and for outputting physical position information in the second computer module indicating the stack position of the second computer module in the stack, and the second computer module further includes resource deciding means to output resource selection information for controlling the second computer module self-selecting the bus resources used by the second computer module based on the physical position information indicating the stack position of the second computer module in the stack, and resource selecting means for selecting the bus resources based on the resource selection information, and for the bus resources managed by the bus resource managing means, the second computer module selects the bus resources according to the physical position of the second computer module itself in the stack, and uses the selected bus resources.

2. The computer system according to claim 1, wherein the resource deciding means includes a resource configuration switch and a manual configuration enable switch, and if manual configuration is enabled by the manual configuration enable switch, the resource selection information is outputted using the resource configuration switch.

3. The computer system according to claim 1, wherein the second computer module includes a plurality of second sub computer modules each including a pair of position information connectors connected to the position identification means, and the plurality of second sub computer modules are connected to one another through the pair of position information connectors in a stack manner without depending on physical positions of the plurality of second sub computer modules stacked.

4. The computer system according to claim 1, wherein the plurality of computer modules have a same manufacture.

5. The computer system according to claim 1, wherein the second computer module and subsequent computer modules in the stack are each adapted to receive the physical position configuration information on an input side of a stackable connector, and to output a changed physical position configuration information on an output side of a stackable connector, where the changed physical position configuration information is useable by a next computer module in the stack for determining a physical stack position of the next computer module in the stack in relation to the first computer module.

6. A computer system comprising a plurality of computer modules connected to one another in a stack, via a stacked interconnection of the computer modules to one another using stackable connectors including a system bus having bus resources including at least one of interrupts and clocks, wherein a first computer module among the plurality of computer modules includes bus resource managing means, a second computer module among the plurality of computer modules includes position identifying means for identifying a unique physical stack position of the second computer module in the stack in relation to the first computer module, on a basis of position configuration information output by the first computer module and useable by the computer modules in the stack for determining a physical stack position of the computer modules in relation to the first computer module, and for outputting physical position information in the second computer module indicating the stack position of the second computer module in the stack, and the second computer module further includes resource deciding means to output resource selection information for controlling the second computer module self-selecting the bus resources used by the second computer module based on the physical position information indicating the stack position of the second computer module in the stack, and resource selecting means for selecting the bus resources based on the resource selection information, and for the bus resources managed by the bus resource managing means, the second computer module selects the bus resources according to the physical position of the second computer module itself in the stack, and uses the selected bus resources.

7. The computer system according to claim 6, wherein the plurality of computer modules have a same manufacture.

8. A computer system comprising a plurality of computer modules connected to one another in a stack, via a stacked interconnection of the computer modules to one another using stackable connectors including a system bus having bus resources including at least one of interrupts and clocks, wherein a first computer module among the plurality of computer modules includes position configuration means for outputting physical position configuration information useable by other computer modules in the stack for determining a physical stack position of the other computer modules in the stack in relation to the first computer module, and includes clock managing means, a second computer module among the plurality of computer modules includes position identifying means for identifying a unique physical stack position of the second computer module in the stack in relation to the first computer module, on a basis of the position configuration information received from the first computer module, and for outputting physical position information in the second computer module indicating the stack position of the second computer module in the stack, and the second computer module further includes resource deciding means to output resource selection information for controlling the second computer module self-selecting the bus resources used by the second computer module based on the physical position information indicating the stack position of the second computer module in the stack, and resource selecting/managing means for selecting or managing the bus resources based on the resource selection information, and for the bus resources managed by the clock managing means or resource selecting/managing means, the second computer module selects the bus resources according to the physical position of the second computer module itself in the stack, and uses the selected bus resources.

9. The computer system according to claim 8, wherein the plurality of computer modules have a same manufacture.

10. A computer system comprising a plurality of computer modules connected to one another in a stack, via a stacked interconnection of the computer modules to one another using stackable connectors including a system bus having bus resources including at least one of interrupts and clocks, wherein a first computer module among the plurality of computer modules includes clock managing means, a second computer module among the plurality of computer modules includes position identifying means for identifying a unique physical stack position of the second computer module in the stack in relation to the first computer module, on a basis of position configuration information output by the first computer module and useable by the computer modules in the stack for determining a physical stack position of the computer modules in relation to the first computer module, and for outputting physical position information in the second computer module indicating the stack position of the second computer module in the stack, and the second computer module further includes resource deciding means to output resource selection information for controlling the second computer module self-selecting the bus resources used by the second computer module based on the physical position information indicating the stack position of the second computer module in the stack, and resource selecting/managing means for selecting or managing the bus resources based on the resource selection information, and for the bus resources managed by the clock managing means or resource selecting/managing means, the second computer module selects the bus resources according to the physical position of the second computer module itself in the stack and uses the selected bus resources.

11. The computer system according to claim 10, wherein the plurality of computer modules have a same manufacture.

12. A computer system comprising a plurality of computer modules connected to one another in a stack, via a stacked interconnection of the computer modules to one another using stackable connectors including a system bus having bus resources including at least one of interrupts and clocks, wherein a second computer module among the plurality of computer modules includes position identifying means for identifying a unique physical stack position of the second computer module in the stack in relation to a first computer module, on a basis of position configuration information output by the first computer module and useable by the computer modules in the stack for determining a physical stack position of the computer modules in relation to the first computer module, and for outputting physical position information in the second computer module indicating the stack position of the second computer module in the stack, and the second computer module further includes resource deciding means to output resource selection information for controlling the second computer module self-selecting the bus resources used by the second computer module based on the physical position information indicating the stack position of the second computer module in the stack, and resource selecting/managing means for selecting or managing the bus resources based on the resource selection information, and for the bus resources managed by the resource selecting/managing means, the second computer module selects the bus resources according to the physical position of the second computer module itself in the stack and uses the selected bus resources.

13. The computer system according to claim 12, wherein the plurality of computer modules have a same manufacture.

14. A computer system comprising a plurality of computer modules connected to one another in a stack, via a stacked interconnection of the computer modules to one another using stackable connectors including a system bus, said bus carrying selectable bus signals including at least one of selectable interrupt signals and selectable clock signals, wherein a first computer module among the plurality of computer modules includes position configuration means for outputting a physical position identification signal useable by other computer modules in the stack for determining a physical stack position of the other computer modules in the stack in relation to the first computer module, and where the first computer module further includes bus signal managing means for managing the selectable bus signals, a second computer module among the plurality of computer modules includes position identifying means for identifying its physical stack position in the stack in relation to the first computer module, on a basis of the physical position identification signal received from the first computer module, and for providing corresponding stack position information for the second computer module indicating the stack position of the second computer module in the stack, and the second computer module further includes signal deciding means to provide signal selection information for controlling the second computer module self-selecting one or more bus signals to be used by the second computer module based on the position information indicating the stack position of the second computer module in the stack, and signal selecting means for selecting the one or more bus signals based on the signal selection information.

15. The computer system according to claim 14, wherein the selectable bus signals comprise selectable clock signals.

16. The computer system according to claim 14 or 15, wherein the resource deciding means includes a resource configuration switch and a manual configuration enable switch, and if manual configuration is enabled by the manual configuration enable switch, the resource selection information is outputted using the resource configuration switch.

17. The computer system according to one of the claims 14 to 15, wherein the second computer module Includes a plurality of second sub computer modules each including a pair of position information connectors connected to the position identification means, and the plurality of second sub computer modules are connected to one another through the pair of position information connectors in a stack manner without depending an physical positions of the plurality of second sub computer modules stacked.

18. The computer system according to claim 14, wherein the plurality of computer modules have a same manufacture.

19. The computer system according to claim 14, wherein the position identifying means is for identifying a unique physical position of the second computer module.

* * * * *